United States Patent
Usami et al.

(10) Patent No.: US 8,323,762 B2
(45) Date of Patent: Dec. 4, 2012

(54) METHOD FOR MANUFACTURING MEDIUM ON WHICH INFORMATION IS RECORDED IN PIT PATTERN

(75) Inventors: Yoshihisa Usami, Ashigarakami-gun (JP); Tetsuya Watanabe, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 412 days.

(21) Appl. No.: 12/673,565

(22) PCT Filed: May 16, 2008

(86) PCT No.: PCT/JP2008/001227
§ 371 (c)(1),
(2), (4) Date: Feb. 15, 2010

(87) PCT Pub. No.: WO2009/022442
PCT Pub. Date: Feb. 19, 2009

(65) Prior Publication Data
US 2011/0222391 A1    Sep. 15, 2011

(30) Foreign Application Priority Data
Aug. 16, 2007    (JP) .................................. 2007-212149

(51) Int. Cl.
*B32B 3/02*    (2006.01)
(52) U.S. Cl. ..................... 428/64.1; 428/64.4; 428/64.8; 430/270.11; 430/270.14
(58) Field of Classification Search ................. 428/64.4; 430/270.11, 270.14
See application file for complete search history.

(56) References Cited

U.S. PATENT DOCUMENTS

| 5,230,770 A * | 7/1993 | Kashiwagi ...................... 216/24 |
| 5,643,700 A * | 7/1997 | Otsuka ............................ 430/30 |
| 2004/0209199 A1 | 10/2004 | Kishima et al. |
| 2004/0241589 A1 | 12/2004 | Ito et al. |

FOREIGN PATENT DOCUMENTS

| JP | 03-040244 A | 2/1991 |
| JP | 09-274744 A | 10/1997 |
| JP | 11-250509 A | 9/1999 |

(Continued)

OTHER PUBLICATIONS

Notification of Reasons for Refusal issued by the Japan Patent Office dated Oct. 26, 2010 in connection with Japanese Patent Application No. 2007-212149 corresponding to U.S. Appl. No. 12/673,565.

(Continued)

*Primary Examiner* — Elizabeth Mulvaney
(74) *Attorney, Agent, or Firm* — Sughrue Mion, PLLC

(57) ABSTRACT

A method by which depressions and projections (pit pattern) can be formed directly and easily in a substrate made of inorganic material is provided. A method for forming a medium on which information is recorded in a pit pattern comprises the steps of: forming a recording material layer over a substrate made of inorganic material wherein the recording material layer is of a thermally deformable heat mode recording material; forming a plurality of holes by application of condensed light to the recording material layer; and forming a plurality of pits in the substrate wherein the plurality of pits corresponding to the plurality of holes are etched by using as a mask the recording material layer in which the plurality of holes are formed.

16 Claims, 6 Drawing Sheets

FOREIGN PATENT DOCUMENTS

| | | |
|---|---|---|
| JP | 2003-022583 A | 1/2003 |
| JP | 2004-110936 A | 4/2004 |
| JP | 2004-317782 A | 11/2004 |
| JP | 2005-11489 A | 1/2005 |
| JP | 2006-260634 A | 9/2006 |
| JP | 2007-122775 A | 5/2007 |

OTHER PUBLICATIONS

First Office Action, dated Jan. 26, 2011, issued in corresponding Chinese Application No. 200880102843.5, 12 pages in English and Chinese.

* cited by examiner (a)

(b)

(a)

(b)

(c)

(a)

(b)

(c)

(a)

(b)

(a)

(b)

(c)

(d)

METHOD FOR MANUFACTURING MEDIUM ON WHICH INFORMATION IS RECORDED IN PIT PATTERN

TECHNICAL FIELD

This invention relates to a method for manufacturing a medium on which information is recorded in a pit pattern.

BACKGROUND ART

Among conventionally known methods for manufacturing a medium such as an optical disc on which information is recorded in an optically retrievable manner is a manufacturing method as disclosed in Japanese Laid-Open Patent Application, Publication (JP-A) No. 3-40244. In this technique, first, a glass substrate made of glass that is inorganic matter is coated with a solution made of metal alcoholate, water, hydrochloric acid, alcohol, and other components, to form a predetermined layer. Then, while a mold made of plastic is being applied to this layer, a primary burning operation is carried out at 60-120 degrees centigrade.

Thereafter, the glass substrate is separated from the mold, and subjected to a secondary burning operation at 250-400 degrees centigrade to remove organic components such as a solvent, an additive, etc., so that an amorphous metal oxide layer having a desired pattern of pits and projections (pit pattern) is formed on the glass substrate. By following the process described above, information is recorded as a fine pattern of pits and projections in the metal oxide layer on the glass substrate.

DISCLOSURE OF INVENTION

Problem(s) to be Solved by the Invention

However, in the conventional manufacturing method as described above, the pits and projections are formed in the layer provided on the glass substrate. Therefore, over a long period of storage, the layer having the pits and the projections would possibly become easily stripped off. It would thus be desirable that a fine pattern of pits and projections be formed directly in the substrate of inorganic matter so that a longer period of preservation can be achieved. It is also to be noted that the conventional manufacturing method requires several steps of the coating of a solution, the application of a mold, the primary burning operation, and the secondary burning operation and removal of organic components, which should render the manufacturing process complicate.

With these in view, the present invention has been made in an attempt to provide a method in which a pattern of pits and projections (pit pattern) can be formed easily and directly in a substrate of inorganic matter, and a method by which a medium capable of preserving a recorded information for a longer period of time can be manufactured.

Means for Solving the Problem(s)

In one embodiment of the present invention, a method for manufacturing a medium on which information is recorded in a spit pattern is provided. This method comprises the steps of: forming a recording material layer over a substrate of inorganic matter, wherein the recording material layer is of a thermally deformable heat mode recording material; forming a plurality of holes by application of condensed light to the recording material layer; and forming a plurality of pits in the substrate wherein the plurality of pits corresponding to the plurality of holes are etched by using as a mask the recording material layer in which the plurality of holes are formed.

Here, "holes" may refer not only to holes, for example, each having a bottom, i.e., not pierced through to its opposite side facing the substrate, but also to holes pierced through in the recording material layer so as to expose the substrate.

According to the above-described embodiment of the present invention, first, a recording material layer is formed over a substrate, and then a plurality of holes are formed in the recording material layer by application of condensed light to this recording material layer. Thereafter, the recording material layer having the plurality of holes formed therein is used as a mask for an etching process, to thereby directly form the pits corresponding to the plurality of holes. With this configuration, a pattern of pits and projections can easily be formed on the surface of the substrate merely by following the steps of forming the recording material layer, application of light and etching.

The recording material layer may comprise an organic dye. With this feature, the holes can be formed well in the recording material layer.

In another embodiment of the present invention, the method may be configured such that the step of forming a recording material layer comprises: forming a mask layer on the substrate; and forming the recording material layer on the mask layer, and that the step of forming a plurality of pits comprises: forming a plurality of through holes in the mask layer wherein the plurality of through holes corresponding to the plurality of holes are etched by using as a mask the recording material layer in which the plurality of holes are formed; and forming the plurality of pits wherein the plurality of pits corresponding to the plurality of through holes are etched in the substrate by using as a mask the mask layer in which the plurality of through holes are formed.

In the aforementioned two embodiments, preferably but not necessarily, the steps of removing the recording material layer or the mask layer from the substrate in which the plurality of pits are formed may be included. Further, a protective layer may be provided over the substrate. A reflective layer may be provided over the substrate, and a protective layer may be provided over the reflective layer. With these features, a medium on which information is recorded in an optically retrievable manner can be provided which includes, for example, a CD (Compact Disc), a DVD (Digital Versatile Disc), BD (Blu-ray Disc), etc. Hereupon, it is to be noted that the "protective layer" may be construed to encompass the broad range of the protective layers which include not only a protective layer in CD but also a cover layer in DVD or BD. It is also to be noted that "over" "on" (the substrate or the layer) may be construed to mean not only that it is directly in contact with the substrate or the layer but also that it is placed thereover with any other layer interleaved therebetween.

According to the present invention, only by using a recording material layer to which light has been applied, as a mask to carry out an etching operation on a substrate, a pattern of pits and projections can be formed directly in the substrate of inorganic matter.

The above aspects and advantages, other advantages and further features of the present invention will become more apparent by describing in detail illustrative, non-limiting embodiments thereof with reference to the accompanying drawings.

BEST MODES FOR CARRYING OUT THE INVENTION

A detailed description will be given of the embodiments of the present invention with reference made to the drawings where appropriate.

Figure 1:
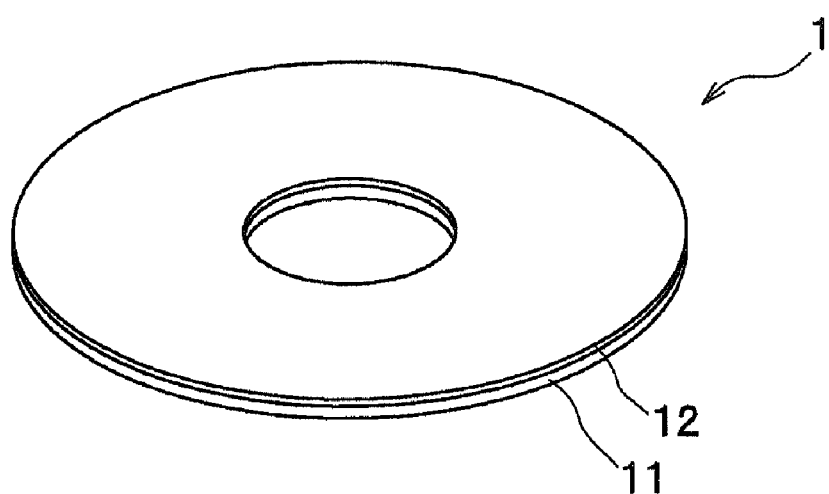
FIG. 1 shows (a) a perspective view of an optical disc manufactured by a manufacturing method according to one embodiment of the present invention, and (b) an enlarged sectional view of a principal portion of the optical disc.
Figure 1:
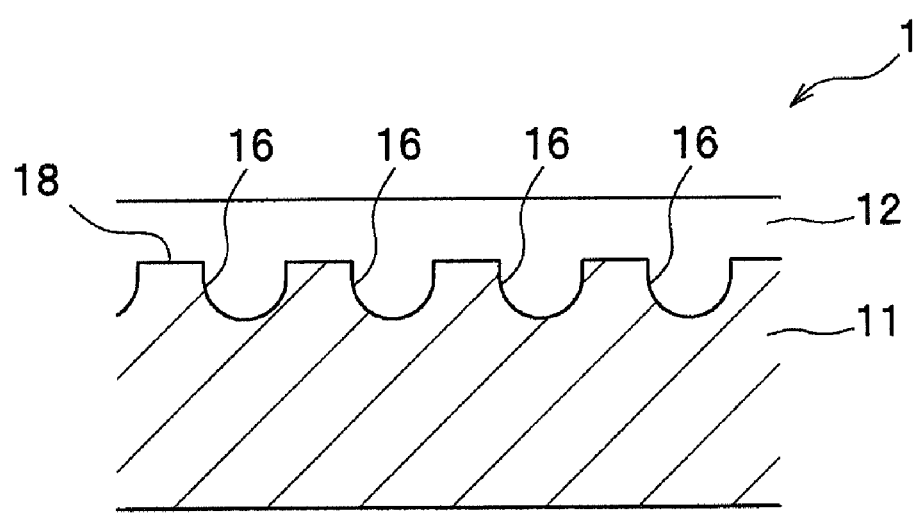

As shown in FIGS. 1 (a) and (b), an optical disc 1 as one example of an information recording medium manufactured by a manufacturing method according to a first embodiment of the present invention comprises a substrate 11 made of inorganic matter, and a protective layer 12 provided over the substrate 11. On a surface 18 of the substrate 11 facing the protective layer 12, a plurality of pits 16 are formed as a means of carrying information.

Materials for the substrate 11 may preferably be selected from those containing Si or Al; for example, Si, $SiO_2$ and $Al_2O_3$ may preferably be adopted. Materials for the protective layer 12 may preferably be selected from inorganic materials such as $SiO_2$ or other inorganic oxides and $Si_3N_4$ or other inorganic nitrides, and organic materials such as UV curing resins, which may be adopted alone or in combination. For the purpose of extending the longevity of the optical disc 1, however, it would be desirable that the protective layer 12 also be formed from an inorganic material.

Next, a method for manufacturing an optical disc 1 according to a first embodiment of the present invention will be described with reference to FIGS. 2-5.

Figure 2:
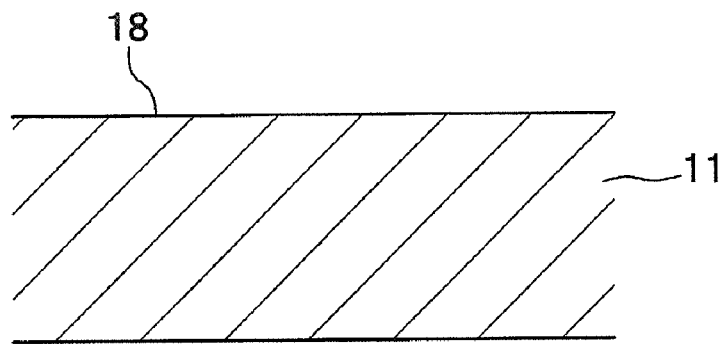
FIG. 2 is a diagram showing a method for manufacturing an optical disc according to a first embodiment of the present invention, in which (a) is a sectional view showing an unprocessed substrate, (b) is a sectional view showing the steps of forming a recording material layer and a barrier layer over the substrate, and (c) is a sectional view showing the step of forming holes in the recording material layer and the barrier layer.
Figure 2:
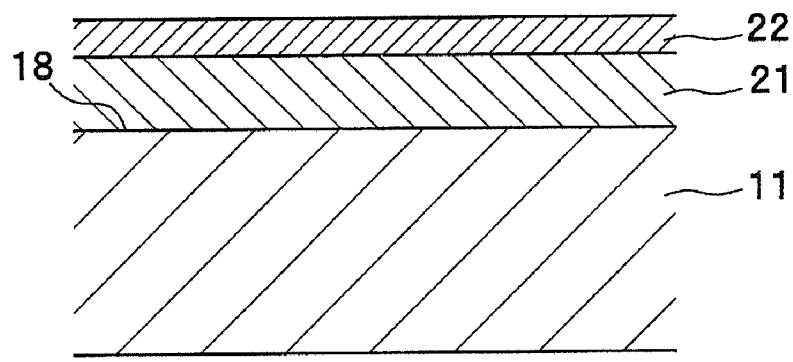
Figure 2:
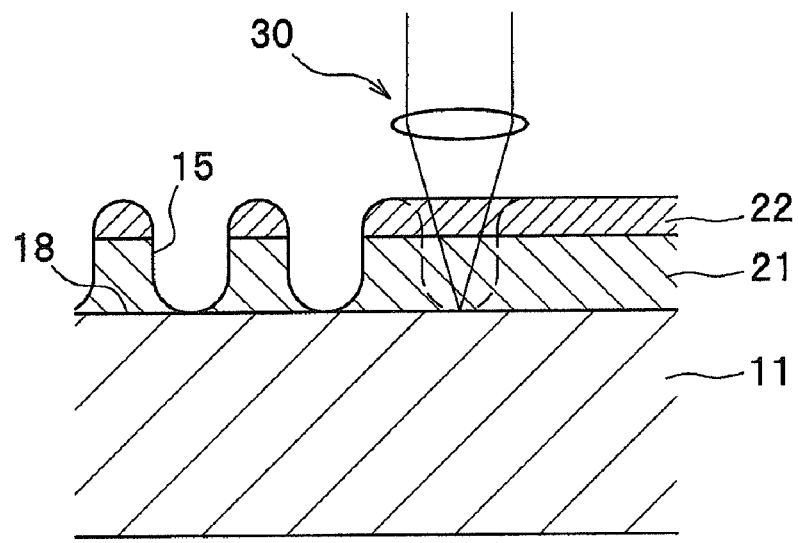

In the method for manufacturing an optical disc 1 according to the first embodiment of the present invention, as shown in FIG. 2 (c), a recording material layer 21 and a barrier layer 22 in which layers 21, 22 holes 15 may be formed as appropriate by application of condensed light are utilized as a mask for etching. Hereinafter, prior to describing the manufacturing method in detail, the recording material layer 21 and the barrier layer 22 utilized as a mask for etching, and holes 15 formed in these layers 21, 22 are described in detail at the outset.

The recording material layer 21 is a layer in which a hole can be formed by application of a beam of strong light, through thermal deformation of material caused by heat produced by conversion of the light applied, that is, a layer of a so-called heat mode recording material. This type of recording material is hitherto used generally in the recording layer of optical discs or the like; for example, recording materials such as cyanine-based, phthalocyanine-based, quinone-based, squarylium-based, azulenium-based, thiol complex salt-based, and merocyanine-based recording materials may be used for our purpose.

The recording material layer 21 may preferably be of a dye type, which contains a dye as a recording material.

Therefore, the recording material contained in the recording material layer 21 may be selected from dyes or other organic compounds. It is to be understood that the material which may be used for the recording material layer 21 is not limited to organic matter; that is, an inorganic material or a composite material of organic and inorganic materials may also be employed. With the organic materials, however, the coating process for forming a film can be performed easily by spin coating, and a material having a lower transition temperature is readily available; thus, the organic material may be preferable. Further, amongst various organic materials, dyes whose light absorption can be controlled by varying their molecular design may be preferable.

Preferred examples of material for use in the recording material layer 21 may include methine dyes (cyanine dyes, hemicyanine dyes, styryl dyes, oxonol dyes, melocyanine dyes, etc.), large ring dyes (phthalocyanine dyes, naphthalocyaninine dyes, porphyrin dyes, etc.), azo dyes (including an azo-metal chelate dye), arylidene dyes, complex dyes, coumarin dyes, azole derivatives, triazine derivatives, 1-aminobutadiene derivatives, cinnamic acid derivatives, quinophthalone dyes, etc.

Of these, a dye-type recording material 21 in which information can be recorded only once with a laser beam may be preferable. This is because such an organic recording material can be dissolved in a solvent and formed into a film by spin coating or spray coating, and therefore excels in productivity. This dye-type recording material 21 may preferably contain a dye having absorption in the range of recording wavelengths. Particularly, the upper limit of an extinction coefficient k indicating the amount of light absorption may preferably be 10 or less, more preferably 5 or less, still more preferably 3 or less, and most preferably 1 or less. This is because too high extinction coefficient k would prevent light incident on one side of the recording material layer 21 from reaching or passing through the opposite side, thus rendering the holes formed in the recording material layer 21 uneven. On the other hand, the lower limit of the extinction coefficient k may preferably be 0.0001 or more, more preferably 0.001 or more, and still more preferably 0.1 or more. This is because too low extinction coefficient k would reduce the amount of light absorption, which would require higher laser power and reduce the production speed.

It is to be understood, as described above, that the recording material layer 21 needs to have absorption of light in the range of recording wavelengths; with this in view, the selection of an appropriate dye and/or alteration of its structure may be made in accordance with the wavelength of the laser beam produced by the laser light source.

For example, in the case where the oscillation wavelength of the laser beam emitted from the laser light source is around 780 nm, it is advantageous to select dyes such as pentamechine cyanine dyes, heptamechine oxonol dyes, pentamethine oxonol dyes, phthalocyanine dyes, and naphthalocyanine dyes.

In the case where the oscillation wavelength of the laser beam emitted from the laser light source is around 660 nm, it is advantageous to select dyes such as trimechine cyanine dyes, pentamethine oxonol dyes, azo dyes, azo-metal complex dyes, and pyrromethene complex dyes.

Further, in the case where the oscillation wavelength of the laser beam emitted from the laser light source is around 405 nm, it is advantageous to select dyes such as monomechine cyanine dyes, monomechine oxonol dyes, zero-mechine melocyanine dyes, phthalocyanine dyes, azo dyes, azo-metal complex dyes, porphyrin dyes, arylidene dyes, complex dyes, coumarin dyes, azole derivatives, triazine derivatives, benzotriazole derivatives, 1-aminobutadiene derivatives, and quinophthalone dyes.

Examples of preferred compounds for use in the recording material layer 21 (i.e., as a recording layer compound) are shown below in the cases where the oscillation wavelength of the laser beam is around 780 nm, around 660 nm, and around 405 nm, respectively. Compounds given by (I-1) to (I-10) in the following chemical formulae 1, 2 are suitable in the case where the oscillation wavelength of the laser beam is around 780 nm. Compounds given by (II-1) to (II-8) in the chemical formulae 3, 4 are suitable in the case where the oscillation wavelength of the laser beam is around 660 nm, and compounds given by (III-1) to (III-14) in the chemical formulae 5, 6 are suitable in the case where the oscillation wavelength of the laser beam is around 405 nm. It is to be understood that the present invention is not limited to the cases where these compounds are used as the recording layer compound.

Examples of Recording Layer Compound in the Case of Oscillation Wavelength Around 780 nm

[Chem. 1]

(I-1)

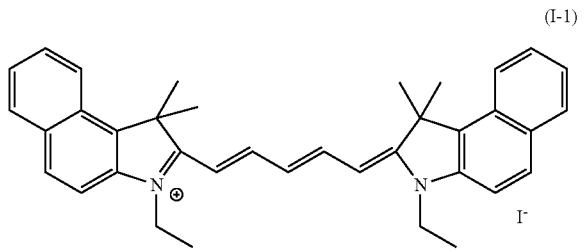

(I-2)

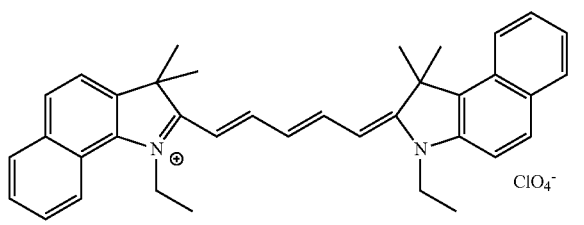

(I-3)

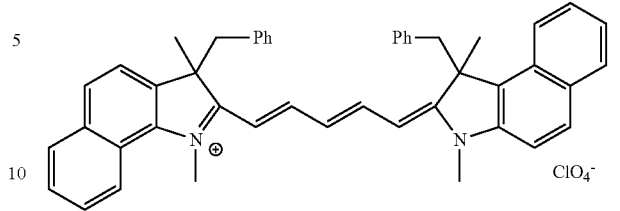

(I-4)

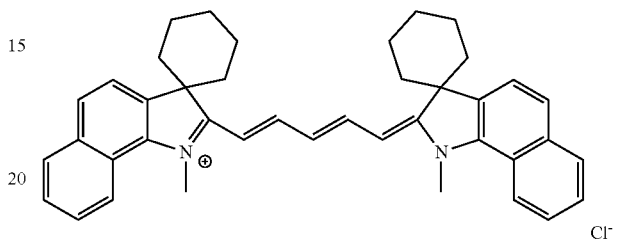

(I-5)

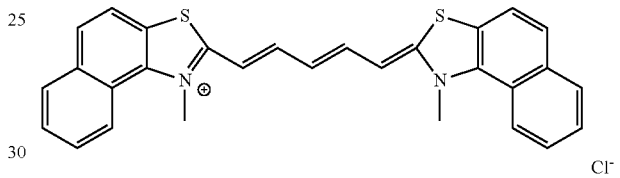

Examples of Recording Layer Compound in the Case of Oscillation Wavelength Around 780 nm

[Chem. 2]

(I-6)

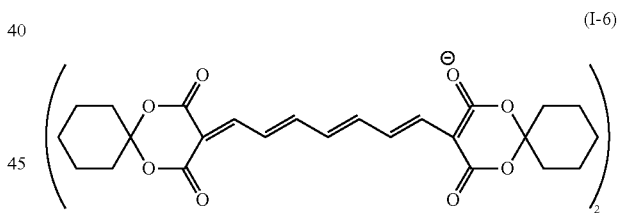

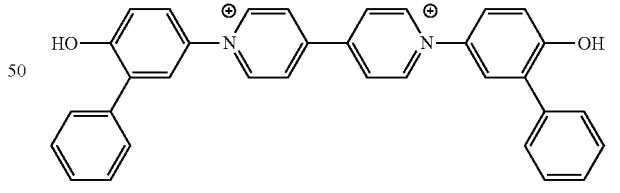

(I-7)

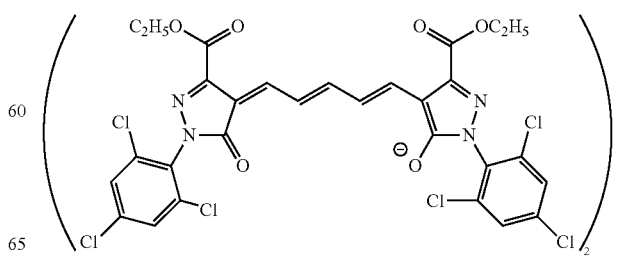

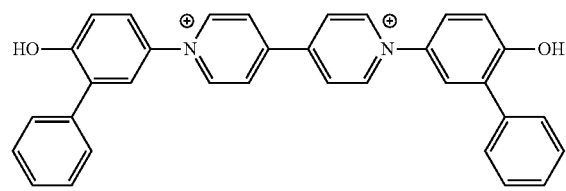
(I-7)
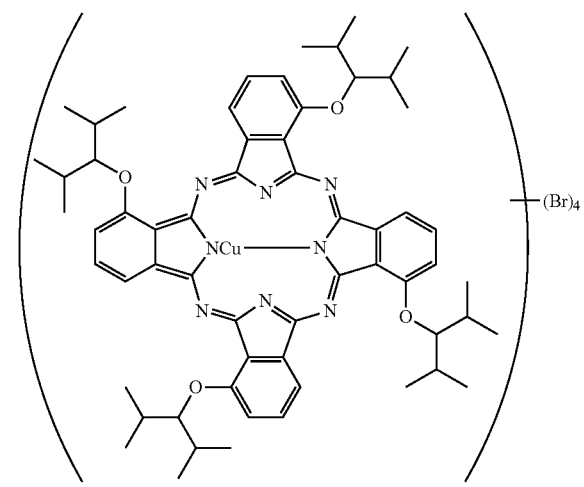
(I-9)
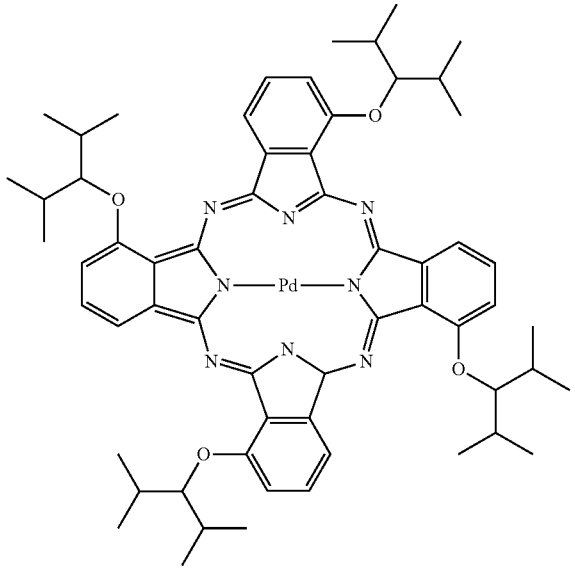
(I-8)
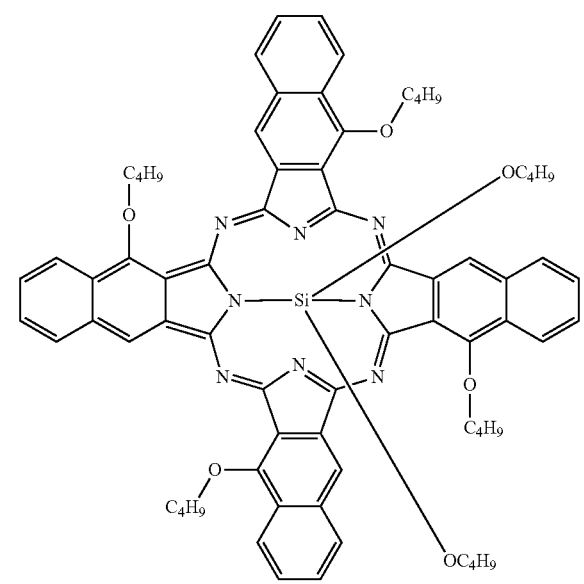
(I-10)
Examples of Recording Layer Compound in the Case of Oscillation Wavelength Around 660 nm
[Chem. 3]
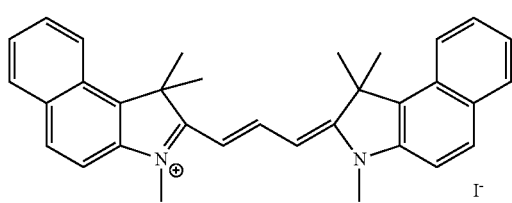
(II-1)
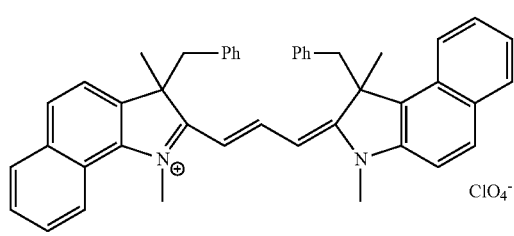
(II-2)

-continued
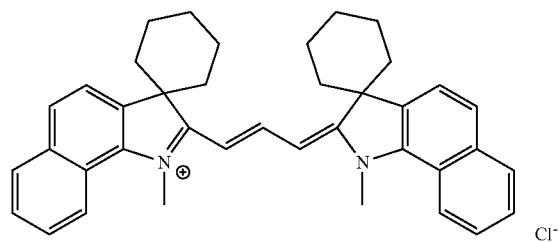
(II-3)
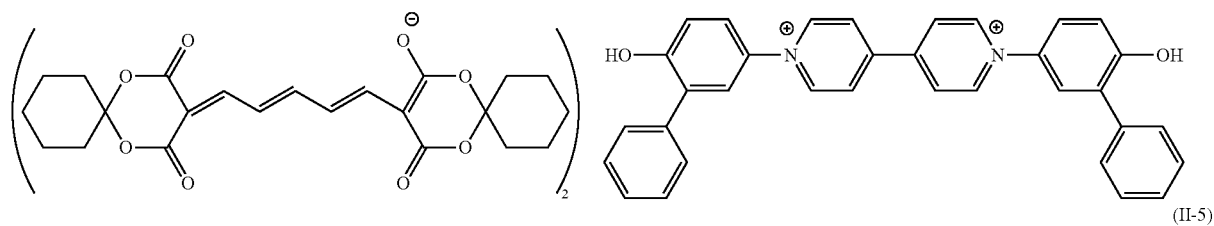
(II-4)
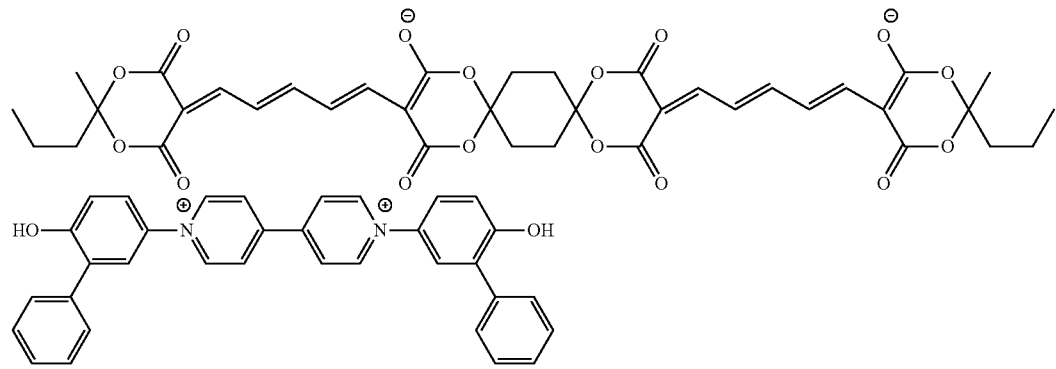
(II-5)
Examples of Recording Layer Compound in the Case of Oscillation Wavelength Around 660 nm
[Chem. 4]
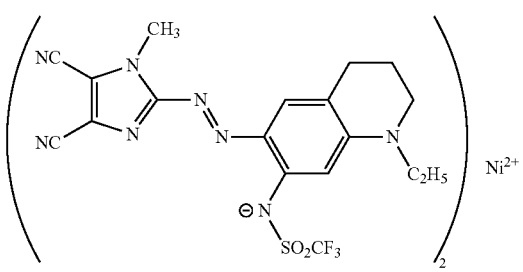
(II-6)
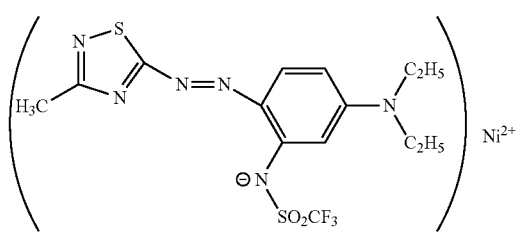
(II-7)
-continued
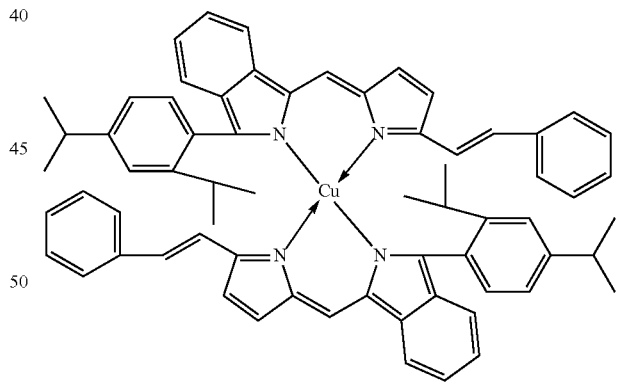
(II-8)
Examples of Recording Layer Compound in the Case of Oscillation Wavelength Around 405 nm
[Chem. 5]
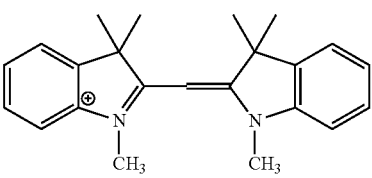
(III-1)

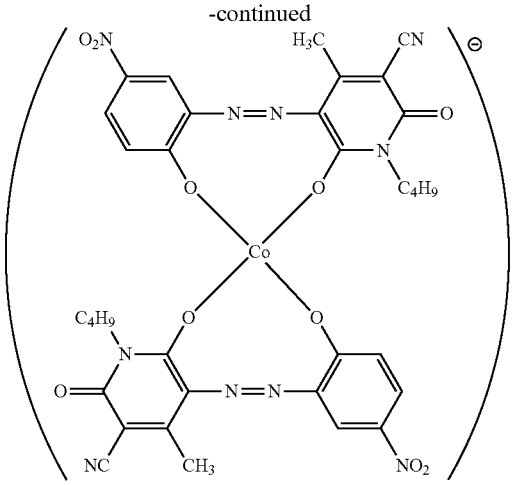
(III-2)
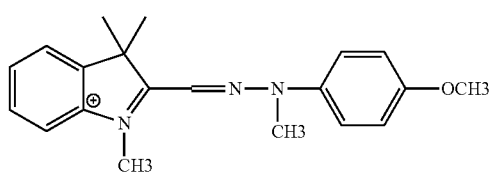
(III-3)
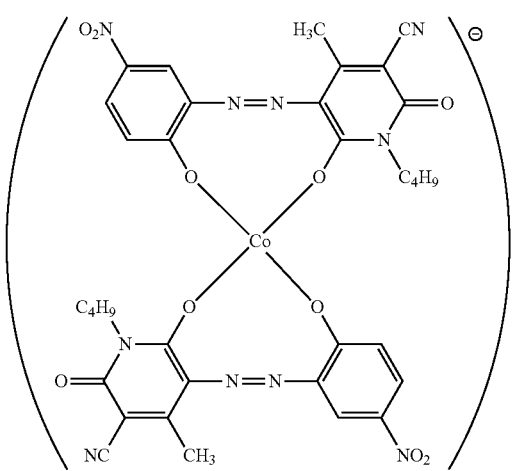
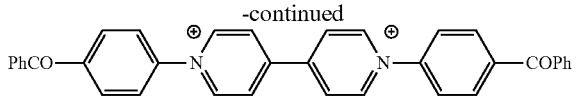
(III-4)
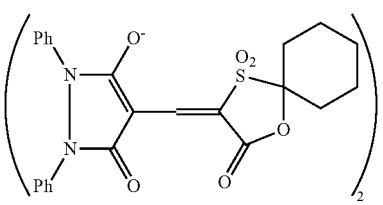
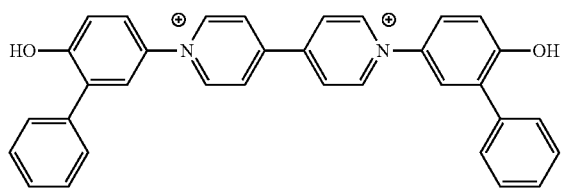
(III-5)
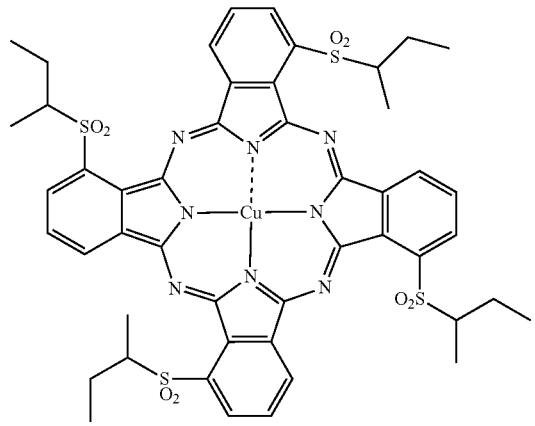
(III-6)
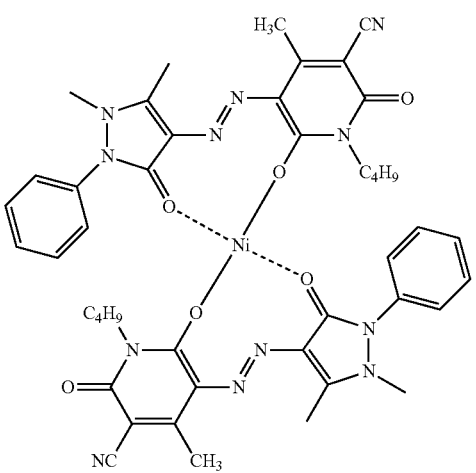

Examples of Recording Layer Compound in the Case of Oscillation Wavelength Around 405 nm

[Chem. 6]

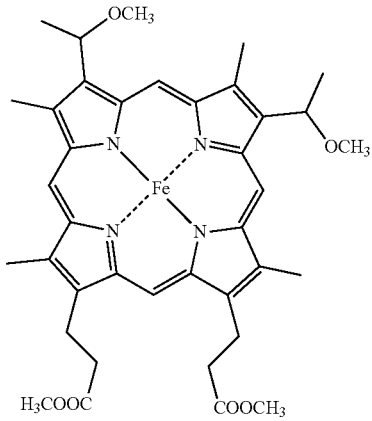
(III-7)

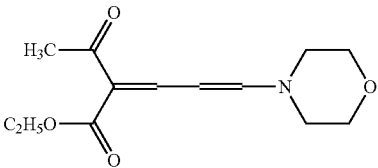
(III-12)

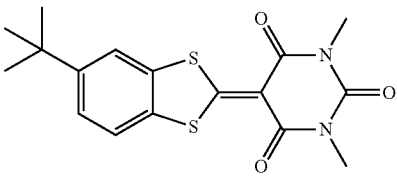
(III-13)

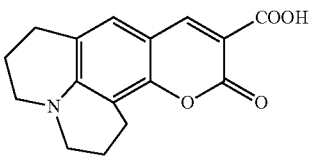
(III-14)

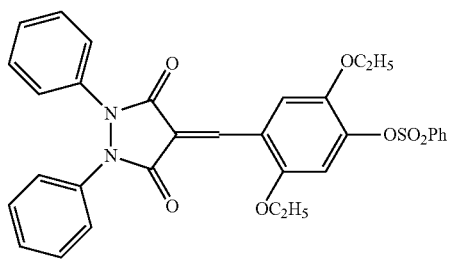
(III-8)

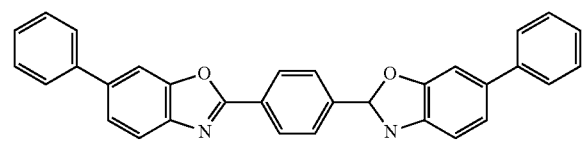
(III-9)

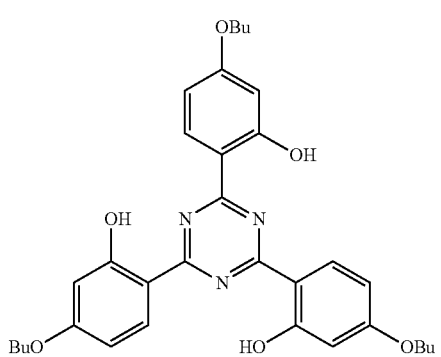
(III-10)

(III-11)

Dyes described in Japanese Laid-open Patent Applications, Publication (JP-A) Nos. 4-74690, 8-127174, 11-53758, 11-334204, 11-334205, 11-334206, 11-334207, 2000-43423, 2000-108513, and 2000-158818 may also preferably be used.

The dye-type recording material layer 21 may be formed by dissolving a dye in an adequate solvent along with a binding agent to prepare a coating liquid, then applying the coating liquid on a substrate to form a coating film, and thereafter drying the resulting coating film. In this process, the temperature of a surface on which the coating liquid is applied may preferably be in the range of 10-40 degrees centigrade. More preferably, the lower limit thereof may be 15 degrees centigrade or higher, still more preferably 20 degrees centigrade or higher, and particularly preferably 23 degrees centigrade or higher. Meanwhile, the upper limit of the surface may be more preferably 35 degrees centigrade or lower, still more preferably 30 degrees centigrade or lower, and particularly preferably 27 degrees centigrade or lower. When the temperature of the coated surface is in the above ranges, uneven application of the coating and coating failure can be prevented, so that a thickness of the coating film can be made uniform.

Each of the upper and lower limits mentioned above may be arbitrarily combined with each other.

Here, the recording material layer 21 may be either mono-layered or multi-layered. In the case of the recording layer 21 having a multi-layered configuration, the coating step is repeated plural times.

A concentration of the dye in the coating liquid may be generally in the range of 0.01-15 mass percent, preferably in the range of 0.1-10 mass percent, more preferably in the range of 0.5-5 mass percent, and most preferably in the range of 0.5-3 mass percent.

Examples of the solvent for the coating liquid may include: esters such as butyl acetate, ethyl lactate and cellosolve acetate; ketones such as methyl ethyl ketone, cyclohexanone, and methyl isobutyl ketone; chlorinated hydrocarbons such as dichloromethane, 1,2-dichloroethane and chloroform; amides such as dimethylformamide; hydrocarbons such as methylcyclohexane; ethers such as tetrahydrofuran, ethyl ether, and dioxane; alcohols such as ethanol, n-propanol, isopropanol, n-butanol, and diacetone alcohol; fluorinated solvents such as 2,2,3,3-tetrafluoropropanol; and glycol ethers such as ethylene glycol monomethyl ether, ethylene glycol monoethyl ether and propylene glycol monomethyl ether.

Taking the solubility of the dye used in the solvents into consideration, the above solvents may be used singly or in a combination of two or more kinds thereof. Various kinds of the additives such as an antioxidant, a UV absorbent, a plasticizer and a lubricant may be added in the coating liquid depending on the purpose.

Coating methods such as spray method, spin coating method, dip method, roll coat method, blade coat method, doctor roll method, doctor blade method, and screen printing method are applicable. Of these methods, the spin coat method is preferable in terms of its excellent productivity and easy controllability of the film thickness.

In order to form the recording material layer 21 (recording layer compound) better by the spin coating method, the dye may be dissolved preferably in the organic solvent in the range of 0.3-30 weight percent, and more preferably in the range of 1-20 weight percent. It is particularly preferable that the dye be dissolved in tetrafluoropropanol in the range of 1-20 weight percent. It is also preferable that the thermal decomposition temperature of the recording layer compound be in the range of 150-500 degrees centigrade, and more preferably in the range of 200-400 degrees centigrade.

The temperature of the coating liquid at the time of coating may preferably be in the range of 23-50 degrees centigrade, more preferably in the range of 24-40 degrees centigrade, and particularly preferably in the range of 25-30 degrees centigrade.

In the case where the coating liquid contains a binding agent, examples of the binding agent may include: natural organic polymers such as gelatin, cellulose derivatives, dextran, rosin and rubber; and synthetic organic polymers including hydrocarbonic resins such as polyethylene, polypropylene, polystyrene and polyisobutylene, vinyl resins such as polyvinylchloride, polyvinylidene chloride and polyvinylchloride-polyvinyl acetate copolymers, acrylic resins such as polymethyl acrylate and polymethyl methacrylate, and initial condensates of thermosetting resins such as polyvinyl alcohol, chlorinated polyethylene, epoxy resin, butyral resin, rubber derivatives and phenol formaldehyde resin. In the case where the binding agent is used together as a material for the recording material layer 21, the amount of the binding agent used is generally in the range of 0.01-50 times the amount of dye (mass ratio), and preferably in the range of 0.1-5 times the amount of dye (mass ratio).

In order to increase the lightfastness of the recording material layer 21, various antifading agents may be contained in the recording material layer 21.

In general, a singlet oxygen quencher is used for the antifading agent. As examples of such singlet oxygen quencher, those described in published documents such as patent specifications hitherto known in the art can be used.

Specific examples of such patent specifications include: Japanese Laid-open Patent Applications, Publication (JP-A) Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995, and 4-25492; Japanese Examined Patent Application, Publication (JP-B) Nos. 1-38680 and 6-26028; German Patent No. 350399; and Nippon Kagaku Kaishi, October (1992), p. 1141. The use amount of the antifading agent such as a singlet oxygen quencher relative to the amount of dye is generally in the range of 0.1-50 mass percent, preferably in the range of 0.5-45 mass percent, more preferably in the range of 3-40 mass percent, and particularly preferably in the range of 5-25 mass percent.

The above description refers to a coating method adopted in the case where the recording material layer 21 is a dye-type recording layer; however, the recording material layer 21 may also be formed by any of the other methods such as evaporation, sputtering, and CVD, which may be selected depending on the physical properties of the recording material to be used therein.

The wavelength at which the dye exhibits the peak absorption may not necessarily fall within the range of the wavelengths of visible light, but may be within the range of ultraviolet or infrared.

The wavelength $\lambda w$ of the laser beam to be emitted to form the holes 15, with respect to the wavelengths $\lambda a$ at which the dye to be used has absorption, may preferably satisfy a relationship as given by $\lambda a < \lambda w$. This relationship, if satisfied, allows the amount of light absorbed in the dye to fall into an adequate range, so that the recording efficiency can be improved and a fine projection/depression pattern can be formed.

The wavelength $\lambda w$ of the laser beam to be emitted to form the holes 15 may be any wavelength as long as a sufficiently high laser power is obtained. For example, in the case where a dye is used for the recording material layer 21, the wavelength may preferably be 1,000 nm or less, such as 193 nm, 210 nm, 266 nm, 365 nm, 405 nm, 488 nm, 532 nm, 633 nm, 650 nm, 680 nm, 780 nm, and 830 nm.

The laser beam may be of any known type such as a gas laser, a solid-state laser and a semiconductor laser. However, in order to simplify the optical system, the use of the solid-state laser or the semiconductor laser is preferable. The laser beam may be a continuous light beam or a pulsed light beam. However, it is preferable to use a laser beam whose emission interval can be changed freely. For example, the use of a semiconductor laser is preferable. In the case where the laser beam is not directly on-off keyed, it is preferable that the laser beam is modulated using an external modulation element.

In order to increase the processing speed, a higher laser power is preferable. However, the higher the laser power, the higher scanning speed (speed for scanning the recording material layer 21 with the laser beam; for example, rotation speed of the optical disc drive which will be described later) is required. For this reason, taking the upper limit value of the scanning speed into consideration, the upper limit value of the laser power is preferably 100 W, more preferably 10 W, and still more preferably 5 W, and most preferably 1 W. Meanwhile, the lower limit value of the laser power is preferably 0.1 mW, more preferably 0.5 mW, and still more preferably 1 mW.

It is preferable that the laser beam has a narrow range of oscillation wavelength and a high coherency, and that the laser beam can be condensed to a spot size which is as small as the wavelength of the laser beam. Further, as a recording strategy (i.e., optical pulse illumination conditions for appropriately forming holes 15), it is preferable that the strategy used for optical discs is employed. To be more specific, conditions required for the manufacture of optical discs, such as recording speed, peak value of the illuminating laser beam, and pulse width, are preferably used.

It is preferable that the recording material layer 21 has a thickness set in accordance with the kind of etching gas to be used, or the depth of the pit 16 which will be described later.

This thickness may be set appropriately, for example, in the range of 1-10,000 nm. The lower limit of the thickness is preferably 10 nm or more, and more preferably 30 nm or more. This is because, if the thickness is too thin, a desired effect as an etching mask can hardly be achieved. Meanwhile, the upper limit of the thickness is preferably 1,000 nm or less, and more preferably 500 nm or less. This is because, if the thickness is too thick, the required laser power is increased, the difficulty comes up in deeply making a hole, and the processing speed is reduced.

Further, it is preferable that the thickness t of the recording material layer 21 and the diameter d of the hole 15 has the following relationship. Namely, the upper limit value of the thickness t of the recording material layer 21 preferably takes a value to satisfy the relationship as given by $t<10\,d$, more preferably takes a value to satisfy $t<5\,d$, and still more preferably to satisfy $t<3\,d$. The lower limit value of the thickness t of the recording material layer 21 preferably takes a value to satisfy the relationship as given by $t>d/100$, more preferably takes a value to satisfy $t>d/10$, and still more preferably to satisfy $t>d/5$. The reason for determining the upper limit value and the lower limit value of the thickness t of the recording material layer 21 in accordance with the diameter d of the hole 15 is the same as that described above.

To form the recording material layer 21, a substance which will act as a recording material is dissolved or dispersed in an appropriate solvent to prepare a coating liquid. Thereafter, the surface 18 of the substrate 11 is coated with this coating liquid by a coating method such as spin coating, dip coating, and extrusion coating, so that the recording material layer 21 can be formed.

The barrier layer 22, which is optionally provided, is formed to protect the recording material layer 21 from damage under an impact, etc. Preferably, but not necessarily, the barrier layer 13 is made of a material which can be formed in a vacuum, such as oxides and sulfides; e.g., $SiO_2$, ZnS, and GaO. Alternatively, an organic material that can be applied by spin coating may also be used.

The thickness of the barrier layer 22 is in the range of 0.1-200 nm, preferably in the range of 1-100 nm, and more preferably in the range of 3-30 nm.

The hole 15 is formed by illuminating a portion of the recording layer 21 and the barrier layer 22 with condensed light to thereby causing deformation (including deformation effected by dissipation or vanishment) at the illuminated portion. To be more specific, the holes 15 are formed in positions corresponding to the positions of the pits 16 (see FIG. 3 (c)) which will be formed, in the substrate 11 as information arranged thereon.

The principle on which the hole 15 is formed is as follows.

When the recording material layer 21 (recording layer compound) is illuminated with a laser beam having a wavelength such that the material has light absorption (i.e., the wavelength of light to be absorbed in the material), the laser beam is absorbed by the recording material layer 21, and then converted into heat to thereby increase the temperature at an illuminated portion of the recording material layer 21. This causes the recording material layer 21 to undergo chemical or/and physical change(s), such as softening, liquefaction, vaporization, sublimation and decomposition. The thus-changed material moves or/and dissipates, and the hole 15 is formed. It is to be understood that the barrier layer 22 is a very thin layer, and thus the barrier layer 22 moves or/and dissipates together with the recording material layer 21 moving or/and dissipating.

As a method for forming holes 15, any hitherto known method for forming pits in a write-once optical or WORM disc is applicable. To be more specific, a known Running OPC (Optimum Power Control) method such as disclosed in Japanese Patent (JP-B2) No. 3096239 can be used, for example. In the Running OPC method, for example, a reflected light intensity of the laser beam that varies in accordance with the pit size is detected, and the output of the laser is adjusted so that the reflected light intensity becomes constant to thereby form uniform sized pits.

It is preferable that the vaporization, sublimation or decomposition of the recording material layer 12 (recording layer compound) as described above occurs at a high rate of change, that is, precipitously. To be more specific, the weight decrease rate obtained by a thermogravimetry differential thermal analysis (TG-DTA) instrument during vaporization, sublimation or decomposition of the recording layer compound is preferably 5% or more, more preferably 10% or more, and still more preferably 20% or more. Further, the slope of weight decrease (weight decrease rate per elevated temperature of 1° C.) obtained by the thermogravimetry differential thermal analysis (TG-DTA) instrument during vaporization, sublimation or decomposition of the recording layer compound is preferably 0.1%/° C. or more, more preferably 0.2%/° C. or more, and still more preferably 0.4%/° C.

The upper limit value of the transition temperature of the chemical change or/and the physical change such as softening, liquefaction, vaporization, sublimation, and decomposition is preferably 2,000° C. or less, more preferably 1,000° C. or less, and still more preferably 500° C. or less. This is because if the transition temperature is too high, a higher laser power is required. The lower limit value of the transition temperature is preferably 50° C. or more, more preferably 100° C. or more, and still more preferably 150° C. or more. This is because if the transition temperature is too low, the temperature gradient relative to that of the environment is so small that the shape of an edge of a hole is not formed clearly.

Hereinbelow, one example of the shape and arrangement of the holes 15 will be described.

Figure 4:
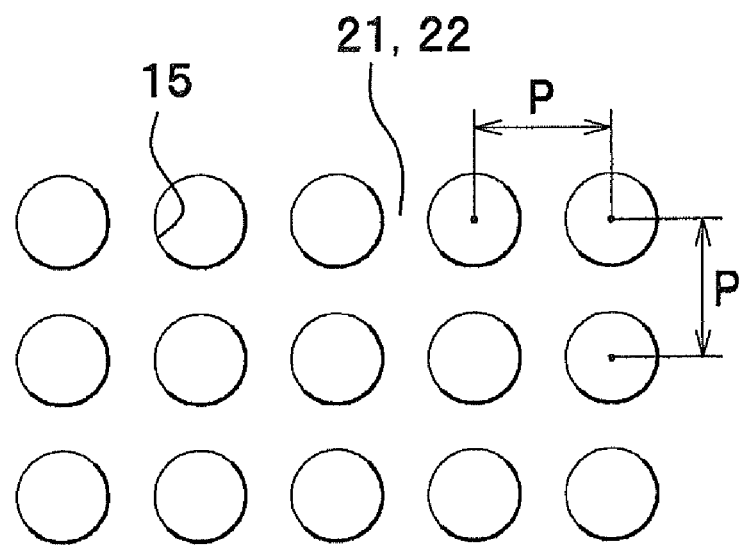
FIG. 4 shows plan views showing (a) one example of a surface of the substrate, and (b) another example thereof.
Figure 4:
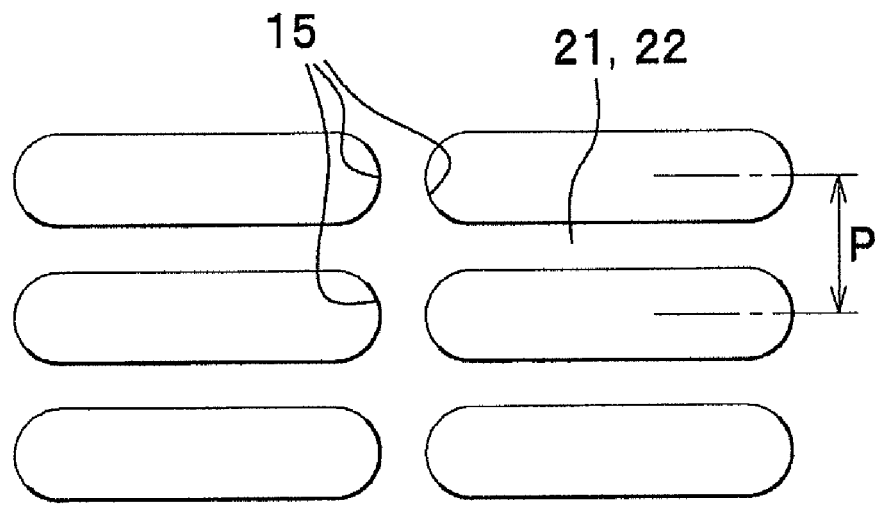

The shape and arrangement as shown in FIG. 4 (a) may be adopted, in which the holes 15, each shaped like a dot, are arranged appropriately (e.g., like lattice points as illustrated) in accordance with information. As shown in FIG. 4 (b), the holes 15 may be formed with a series of interspaced oblong grooves. By changing the arrangement and lengths of the dots in this way, information is encoded in a manner known in the art.

Each hole 15 herein described according to the present embodiment is shaped like a bottomed cylinder having a thin layer 21 of the recording material left on a surface 18 of the substrate 11, but the present invention is not limited to this embodiment. For example, the hole may be formed with an inner peripheral surface of the through hole formed in the recording material layer 21 and the barrier layer 22, and part of the surface 18 of the substrate 11 facing the recording material layer 21.

Next, a detailed description will be given of a method for manufacturing an optical disc 1.

As shown in FIG. 2 (a), first, a substrate 11 fabricated in a circular plate by a method known in the art is prepared.

Then, as shown in FIG. 2 (b), a recording material layer 21 and a barrier layer 22 are formed in this, sequence on a surface 18 of the substrate 11.

Figure 5:
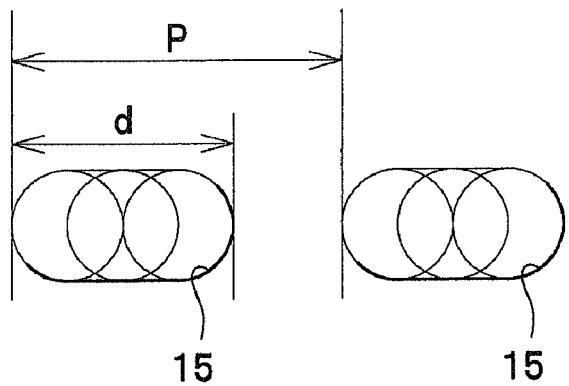
FIG. 5 (a) is a diagram showing a relationship between the lengths and the pitches of the holes, and 5 (b) is a diagram showing a relationship between the pulse duration and period of laser beam emission.
Figure 5:
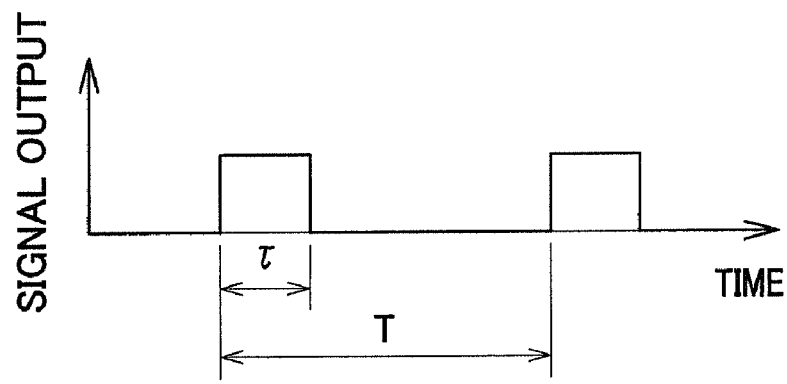

Next, holes 15 are formed. An apparatus for forming the holes 15 may have the same construction as that of an optical disc drive hitherto known in the art. A typical construction of the optical disc drive applicable is disclosed for example in Japanese Laid-Open Patent Application, Publication (JP-A) No. 2003-203348. With this optical disc drive used to form the holes 15, specifically, the substrate 11 on which the recording material layer 21 and the barrier layer 22 are formed is set in the optical disc drive. The recording material layer 21 is then illuminated with a laser beam whose output is adjusted to a level appropriate to change its shape in accordance with the material of the recording material layer 21. Further, pulse signals or continuous-wave signals are input to the laser light source such that the illumination pattern of the laser beam conforms with the dotted pattern of FIG. 4 (a) or the grooved pattern of FIG. 4 (b). As seen in FIG. 5 (b), the duty cycle of the laser beam emitted in a predetermined period T, which is defined by τ/T where τ indicates emission time and T indicates period, is preferably set smaller than the duty cycle of the actually formed holes 15 (i.e., length d of a hole 15 in the laser beam scanning direction versus pitch P; see FIG. 5 (a)). It is noted that an oblong-shaped hole 15 can be formed by moving the circle-shaped laser beam shown in FIG. 5 (a) at a predetermined speed during the emission time τ. For example, assuming that the length d of the hole 15 is 50 while the pitch P of the hole 15 is 100, it is preferable that laser beam is emitted at a duty cycle less than 50%. In this instance, the upper limit value of the duty cycle of the laser beam is preferably less than 50%, more preferably less than 40%, and still more preferably less than 35%. Meanwhile, the lower limit value of the duty cycle is preferably equal to or higher than 1%, more preferably equal to or higher than 5%, and still more preferably equal to or higher than 10%. It is possible to accurately form the hole 15 having a predetermined pitch by setting the duty cycle as described above.

Further, a known focusing method as used in the optical disc drive may also be adapted. For example, by the use of an astigmatic method, the laser beam can be readily focused on the surface 18 of the substrate 11 irrespective of a warpage or bent of the substrate 11.

In order to obtain the minimum processing shape, the laser beam is applied in infinitesimally short times. The upper limit of the diameter of the recessed shape (shortest pit length) formed by such infinitesimally short time application of the laser beam is preferably 10 micrometer or less, more preferably 5 micrometer or less, and still more preferably 2 micrometer or less. The lower limit of the shortest pit length is preferably 10 nm or more, more preferably 50 nm or more, and still more preferably 100 nm or more. In other words, it is preferable that the laser beam is condensed to have a small spot diameter such that the shortest pit length falls within the aforementioned ranges. By setting the shortest pit length in the aforementioned ranges, a mask for high-density recording can be formed.

When a hole 15 having a size larger than that of the minimum processing shape (hereinafter referred to as a "laser spot") is to be formed, laser spots may be connected to provide a larger hole 15. It is noted that when the heat mode-type recording material layer 21 is illuminated with the laser beam, a change of the recording material occurs only in a part of the illuminated portion which reaches the transition temperature. Since the light intensity is greatest at the center in cross section of the laser beam and is gradually attenuated toward the edge of the laser beam, a minute hole (laser spot) having a diameter smaller than the spot diameter of the laser beam can be formed in the recording material layer 21. When a hole 15 is formed with such fine holes arranged contiguously, the precision in the shape of the hole 15 can be increased. On the other hand, if a photon mode-type material is employed, its reaction occurs in the whole illuminated portion where the laser beam strikes the surface thereof. Therefore, the size of the hole (laser spot) formed by a single pulse of the laser beam is relatively large, and the precision in its shape would be diminished in comparison with the cases where a heat mode-type material is employed. In this respect, the heat mode-type material as employed in the present invention is preferable.

In this way, a condensed laser beam is applied by the optical system 30 of the disc drive from the surface 18 side of the substrate 11 as shown in FIG. 2 (c). As is the case where information is recorded in the optical recording disc, the optical system 30 is moved in the radial direction while the substrate 11 is being rotated, so that holes 15 can be formed on the entire surface 18 of the substrate 11.

The holes 15 are formed under the processing conditions as follows.

Numerical aperture NA of the optical system 30 is configured with a lower limit being preferably 0.4 or more, more preferably 0.5 or more, and still more preferably 0.6 or more. Meanwhile, the upper limit of the numerical aperture NA is preferably 2 or less, more preferably 1 or less, and still more preferably 0.9 or less. If the numerical aperture NA is too small, a fine processing cannot be performed. If the numerical aperture NA is too large, a margin is decreased with respect to an angle at a time of recording.

The wavelength of the optical system 30 is set, for example, to 405±30 nm, 532±30 nm, 650±30 nm, and 780±30 nm. These wavelengths are preferable to obtain a higher output. It is to be understood that a shorter wavelength is preferable because the shorter the wavelength, the finer the processing can be performed.

The output of the optical system 30 is configured with a lower limit being 0.1 mW or more, preferably 1 mW or more, more preferably 5 mW or more, and still more preferably 20 mW or more. The upper limit of the output of the optical system 30 is 1,000 mW or less, preferably 500 mW or less, and more preferably 200 mW or less. This is because if the output of the optical system 30 is too low, the processing takes too much time while if the output is too high, the durability of parts constituting the optical system 30 becomes deteriorated.

The linear velocity for relatively moving the optical system 30 with respect to the recording material layer 21 is configured with a lower limit of the linear velocity being 0.1 m/s or higher, preferably 1 m/s or higher, more preferably 5 m/s or higher, and still more preferably 20 m/s or higher. Meanwhile, the upper limit of the linear velocity is 500 m/s or lower, preferably 200 m/s or lower, more preferably 100 m/s or lower, and still more preferably 50 m/s or lower. If the linear velocity is too high, it becomes difficult to perform processing with increased accuracy. If the linear velocity is too low, the processing requires too much time and could not be performed enough to obtain an appropriate shape.

As a specific example of an optical processing apparatus including the optical system 30, NE0500 manufactured by Pulstec Industrial Co., Ltd. can be used.

Figure 3:
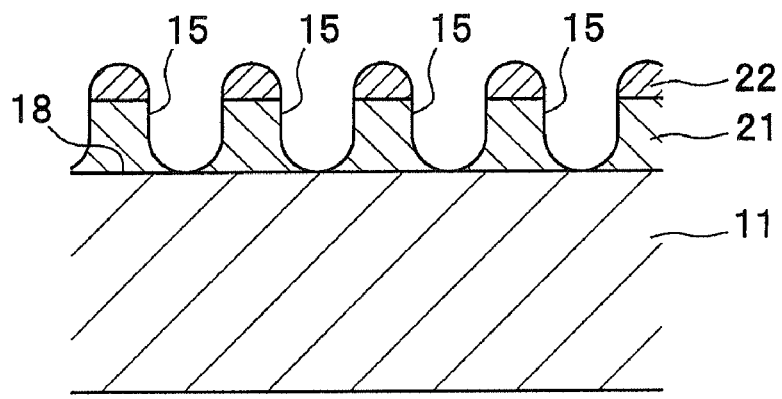
FIG. 3 is a diagram showing a method for manufacturing an optical disc according to the first embodiment of the present invention, in which (a) is a sectional view showing the substrate having holes formed all over a surface thereof, (b) is a sectional view showing the step of etching using the recording material layer and the barrier layer as a mask, and (c) is a sectional view showing the substrate from which the recording material layer and the barrier layer have been removed.
Figure 3:
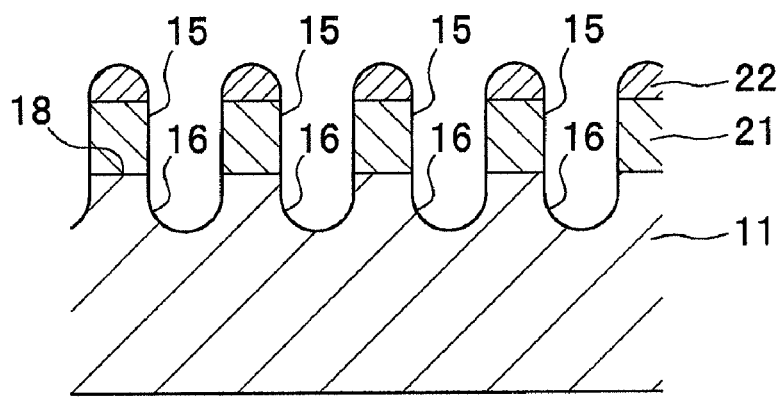
Figure 3:
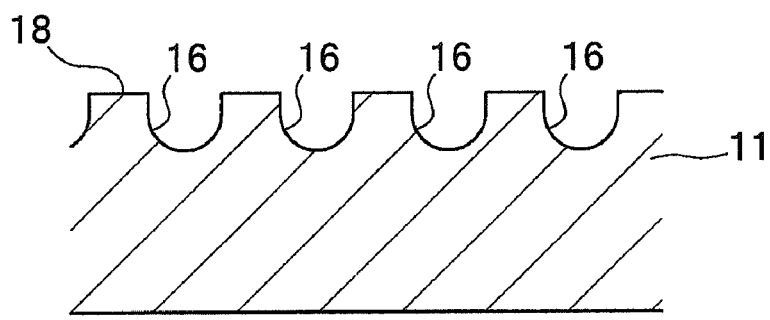

As described above, by using a conventionally known optical disc drive, holes 15 are formed appropriately on an entire surface of the recording material and barrier layers 21, 22 in accordance with information, as shown in FIG. 3 (a). Thereafter, etching is performed by using as a mask the recording material and the barrier, layers 21, 22 in which the holes 15 are formed, to thereby form pits 16 corresponding to the holes 15 on the surface 18 of the substrate 11, as shown in FIG. 3 (b). Then, the recording material and barrier layers 21, 22 are removed by using a predetermined stripping agent or the like, so that the surface 18 of the substrate 11 on which the projections and depressions are formed is exposed as shown in FIG. 3 (c).

Various etching methods such as wet etching and dry etching can be adopted. The dry etching method may preferably be adopted; in particular, RIE (reactive ion etching) may be preferable in which the etching gas has a good rectilinearly traveling (anisotropic) property and thus can provide fine patterning. Meanwhile, removal of the recording material layer 21 and the barrier layer 13 may be carried out by various methods including a dry process and a wet process.

As a specific combination of the etching method and the removal method, for example, RIE using SF6 as an etching gas and a wet removal method using ethanol as a stripping agent may be adopted in the case where the material of the substrate 11 is glass, the material of the recording material layer 21 includes a dye and the material of the barrier layer 22 is an inorganic material.

After the pits 16 are formed in the substrate 11 as described above, a protective layer 12 (see FIG. 1 (b)) is formed on the surface 18 side of the substrate 11 according to a method known in the art; eventually, an optical disc 1 is manufactured.

According to the present embodiment, as described above, the following advantageous effects can be achieved.

Through a simple process of etching on a substrate 11 using as a mask the recording material layer 21 and the barrier layer 22 to which light has been applied, projections and depressions can easily be formed directly on the substrate 11 made of inorganic matter. In cases where a conventional etching process using a photoresist is adopted in the method of manufacturing an optical disc 1, the process requires the steps of: (1) forming a plurality of holes corresponding to information, in a mask; (2) forming a photoresist on a substrate; (3) setting the mask cover the photoresist; (4) illuminating the photoresist through the mask; (5) removing illuminated portions of the photoresist; (6) etching; and (7) removing the remaining portions of the photoresist. In contrast, with the method of manufacture implemented according to the present invention, only through the step of applying light to the recording layer 21 and the barrier layer 22 on the substrate 11, a mask can be formed and set at the same time. Thus, the steps (1)-(3) required when the photoresist is used can be simplified into a single step. Moreover, with the method of manufacture according to the present invention, a plurality of apertures (holes) can be formed merely by illuminating the recording material layer 21 and the barrier layer 22 with light. Thus, the step (5) required when the photoresist is used can be omitted. In this way, the method of manufacture according to the present invention can form a fine pattern of projections and depressions on a substrate made of inorganic matter, more easily than the conventional etching method.

Moreover, with the aforementioned etching method using a photoresist, disadvantageously, if the substrate is warped, a mask would not be brought into close contact therewith. In contrast, with the method of manufacture according to the present invention, a mask is set precisely in close contact with the surface 18 of the substrate 11, by forming a plurality of holes 15, using the focusing method or the like, on the recording material layer 21 and other layer formed on the substrate 11. Thus, the warpage of the substrate would not result in failure to bring a mask into close contact with the substrate, so that the depressions and projections can be formed easily.

Furthermore, with the aforementioned etching method using a photoresist, disadvantageously, formation of a plurality of fine holes requires very complicated operations; however, with the method of manufacture according to the present invention, formation of a plurality of fine holes in the recording material layer 21 and other layer can be achieved easily and swiftly by using the focusing method or the like as known in the art.

Formation of the recording material layer 21 can be performed in large quantities at one time by a coating or like method, and thus optical discs 1 can be manufactured swiftly and inexpensively.

The present invention is not limited to the above-described embodiment, and can be implemented in various other forms as will be described below by way of example.

In the above-described embodiment, the optical disc 1 is comprised of a substrate 11 and a protective layer 12, but the present invention is not limited to this configuration; its layer configuration may be altered where appropriate. It is however to be understood that the layer configuration should preferably be adapted, in view of its universal availability, to allow prevailing optical disc drives to read out information therefrom. The material for each layer which makes up the optical disc may preferably be of inorganic matter because the use of such material will contribute to the extended longevity of the optical disc. However, the material of organic matter may be adopted, if the material is selected from those which are not capable of eroding the shapes of pits (pits 16) formed, and in this case, as well, the extended longevity of the optical disc can be achieved. Moreover, the material capable of eroding the shapes of pits may be adopted, if such material is applied only to a layer which is not adjacent to the surface 18 on which the pits 16 are to be formed, and in this case, as well, the extended longevity of the optical disc can be achieved. In other words, if the layer configuration is such that the shapes of pits will not be destroyed, the extended longevity of the optical disc can be achieved, because as long as the shapes of pits (pits 16) of the substrate 11 remain undestroyed, information can be retrieved therefrom by any fine structure detection means such as optical microscope, electron microscope and AFM (Atomic Force Microscope).

Examples of the above-described layer configurations which may be adopted include a CD (Compact Disc) type having a reflective layer and a protective layer provided on a substrate, a DVD (Digital Versatile Disc) type having a reflective layer, an adhesive layer and a cover layer provided on a substrate, and a BD (Blu-ray Disc; trademark) type having a reflective layer and a cover layer provided on a substrate. Here, the reflective layer may preferably be of material selected from noble metals such as gold, silver and platinum, in view of the extended longevity of the information recording medium. The adhesive layer may preferably be of an ultraviolet cure adhesive such as SD-347 marketed by DIC Corporation, for example. The protective layer and the cover layer may preferably be of material selected from those which may be employed for the protective layer 12 according to the above-described embodiment.

In the above-described embodiment, the protective layer 12 is provided, but the present invention is not limited to this configuration, and the protective layer may not be provided.

In the above-described embodiment, the step of removing the recording material layer 21 and the barrier layer 22 which remain after etching is added, but the present invention is not limited to this configuration; rather, the removing step may not be provided if the recording material layer 21 and the barrier layer 22 are stripped to vanish while the pits 16 are formed in the etching process. Alternatively, the recording material layer 21 and the barrier layer 22 remaining after the etching process may be left as is, as the case may be.

In the above-described embodiment, the method of recording information (the recording scheme adopted to the step of forming holes in the recording material layer 21) is not specified. The method may be either in a digital recording scheme or in an analog recording scheme. However, the method in the digital recording scheme by which the high-density recording can be achieved may be preferably adopted. In particular, the generally prevailing recording schemes as used for recording in CD, DVD, BD, HD DVD (High-Definition Digital Versatile Disc), etc. may be preferable in view of universal usability and in that any currently available recording apparatus can be utilized.

In the above-described embodiment, a laser beam is employed to form holes 15, but the light to be applied may not be a monochromatic light beam such as a laser beam, if the light can be condensed into a beam having a required dimension.

In the above-described embodiment, the barrier layer 22 is formed on the recording material layer 21, but the present invention is not limited to this configuration, and the barrier layer 22 may not be provided. Rather, if the recording layer material 21 is used as an etching mask as in the present embodiment, it may be preferable that the barrier layer 22 be omitted.

Figure 6:
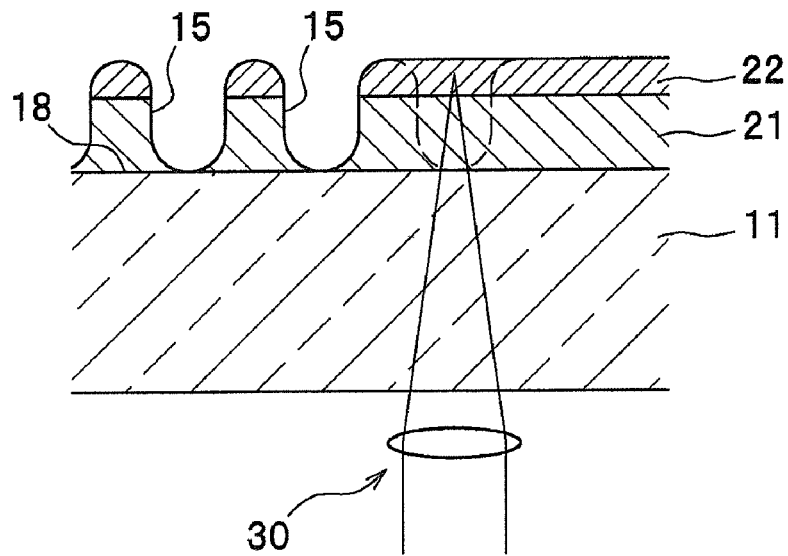
FIG. 6 is a sectional view showing a method for forming holes by application of laser beams from a back side of the substrate.

In the above-described embodiment, the laser beam is applied from the surface 18 side of the substrate 11 on which the recording material layer 21 and other layer are formed, but the present invention is not limited to this configuration. In cases where the substrate is made of a material which transmits a laser beam, the laser beam may be applied from a back side (opposite to the side on which the recording material layer 21 and other layer are provided) of the substrate 11 as shown in FIG. 6.

In the above-described embodiment, the recording material layer 21 and other layer are formed, as an etching mask, directly on the surface 18 of the substrate in which the pits 16 are to be formed, but the present invention is not limited to this configuration. For example, if the recording material layer 21 and other layer are easily stripped by an etching gas applied for etching on the substrate 11, a mask layer 17 which can be subjected to etching by an etching gas substantially insusceptible to the recording material layer 21 and other layer may be provided, as shown in FIG. 7 (*a*), between the surface 18 of the substrate 11 and the recording material layer 21 (Second embodiment).

Figure 7:
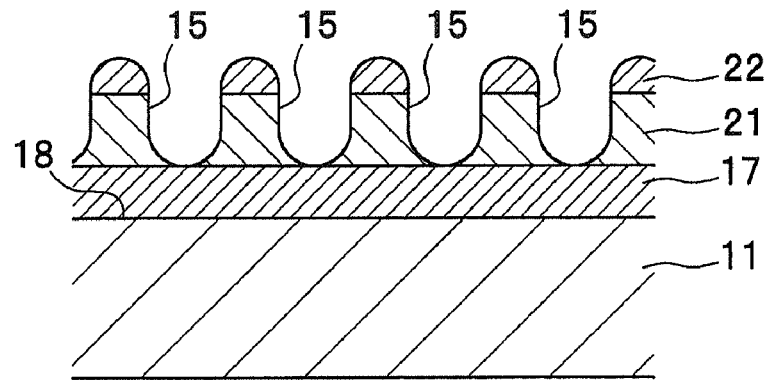
FIG. 7 is a diagram showing a method for manufacturing an optical disc according to a second embodiment of the present invention, in which (a) is a sectional view showing a substrate with a mask layer formed between a recording material layer and the surface of the substrate, (b) is a sectional view showing the step of etching on the mask layer using the recording material layer and the barrier layer as a mask, (c) is a sectional view showing the step of etching on the substrate mainly using the mask layer as a mask, and (d) is a sectional view showing the substrate from which the mask layer has been removed.
Figure 7:
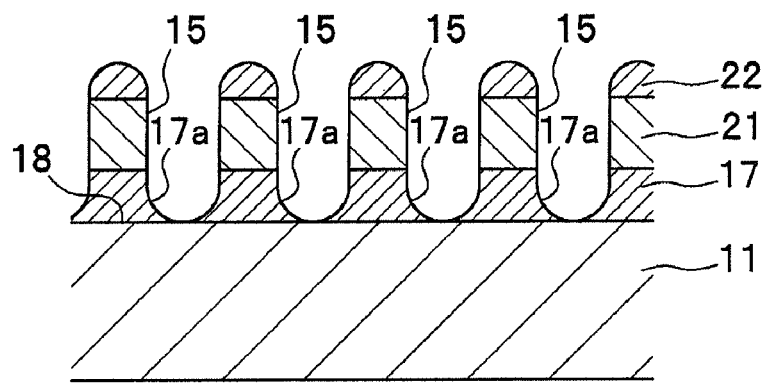
Figure 7:
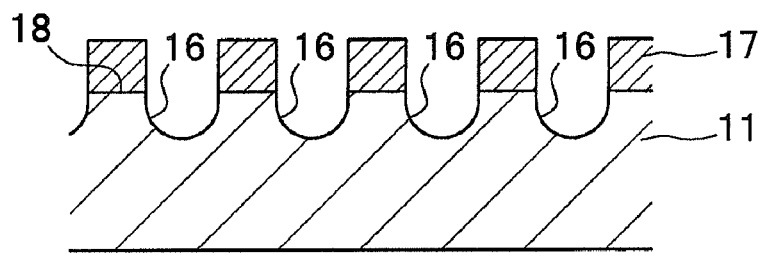
Figure 7:
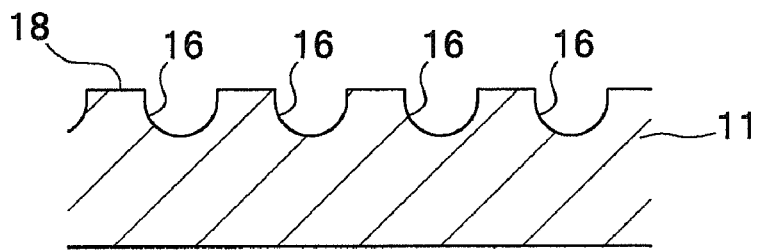

According to the second embodiment, first, as in the above-described first embodiment, holes 15 are formed by a laser beam in the recording material layer 21 and the barrier layer 22 (see FIG. 7 (*a*)). Next, the mask layer 17 is subjected to etching by a first etching gas to form through holes 17*a* corresponding to the holes 15 in the mask layer 17 as shown in FIG. 7 (*b*). In this step, since a particular type of gas such that the recording material layer 21 and the barrier layer 22 are not stripped thereby is selected as the first etching gas, the mask layer 17 is subjected to etching with the recording material layer 21 and the barrier layer 22 serving as a mask.

Thereafter, the substrate 11 is subjected to etching by a second etching gas, to thereby form pits 16 corresponding to the holes 15 on the surface 18 of the substrate 11 as shown in FIG. 7 (*c*). During this process, the recording material layer and the barrier layer 22 are subjected to etching by the second etching gas, and thus removed promptly; however, the substrate 11 is subjected to etching successfully and excellently because the mask layer 17 serves as a mask. Subsequently, the mask layer 17 is removed by using a predetermined stripping agent or the like, so that the surface 18 of the substrate 11 on which the projections and depressions are formed is exposed as shown in FIG. 7 (*d*).

As a specific example of the configuration shown in FIG. 7, a Si-containing Bi-Layer photoresist manufactured by TOKYO OHKA KOGYO CO., LTD. may be employed as the mask layer 17, SF6 may be used as the first etching gas, and Cl₂ may be used as the second etching gas, for example, in the case where the substrate 11 is made of sapphire, the recording material layer 12 contains dye, and the barrier layer 22 is made of an inorganic material layer.

EXAMPLE

One example implemented with which the advantageous effects of the present invention have been confirmed will be described below.

In the example, a substrate similar to that of the above-described embodiment was manufactured. The substrate was formed like a disc, and a dye-containing layer (recording material layer) having a thickness of approximately 100 nm and a barrier layer were formed thereon as an etching mask, and RIE was carried out.

Details are as follows.

Substrate

| Material: | Silicon |
|---|---|
| Thickness: | 0.5 mm |
| Outer diameter: | 101.6 mm (4 inch) |
| Inner diameter: | 15 mm |

Dye-Containing Layer (Recording Material Layer)

2 g of the dye-containing material given by the following chemical formula was dissolved in 100 ml of TFP (tetrafluoropropanol) solvent, and the resulting solution was spin coated. In this spin-coating process carried out with a dispense-start rotation speed of 500 rpm and a dispense-end rotation speed of 1,000 rpm, a coating liquid was dispensed onto the inner radius of the substrate, and the rotation speed was gradually increased to 2,200 rpm. The refractive index n of the dye-containing material was 1.986 and the extinction coefficient k of the dye-containing material wag 0.0418.

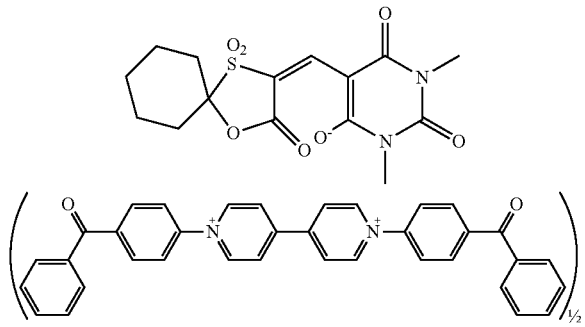

Barrier Layer

A thin film of ZnO—Ga₂O₃ (ZnO: 95 weight percent, Ga₂O₃: 5 weight percent) was formed by DC magnetron sputtering.

| Thickness: | approximately 5 nm |
|---|---|
| Output: | 1 kW |
| Film-formation time: | 2 seconds |
| Atmosphere: | Ar (flow rate of 50 sccm) |

In the above substrate, fine holes were formed from the barrier layer side using NE0500 (wavelength: 405 nm, NA: 0.85) manufactured by Pulstec Industrial Co., Ltd. The holes were arranged in a pattern as shown in FIG. 4 (*a*), and the arrangement pitch was 0.5 μm.

Conditions for forming the holes were as follows.

| Laser output: | 2 mW |
|---|---|
| Linear velocity: | 5 m/s |
| Recording signal: | Square wave of 5 MHz |

RIE was performed by using as a mask the recording material and other layers in which holes were formed, and pits were formed on a surface of the substrate. The conditions of RIE were as follows.

| Etching gas: | SF6 + CHF3 (1:1) |
|---|---|
| Depth of the pits: | 50 nm |
| Stripping agent for stripping the recording material and other layers: | ethanol |

In this way, it was proved that fine pits as information were formed on the substrate of the optical disc in good condition.

The invention claimed is:

1. A method for manufacturing a medium on which information is recorded in a pit pattern, comprising the steps of:
    forming a recording material layer over a substrate of inorganic matter, wherein the recording material layer is of a thermally deformable heat mode recording material;
    forming a plurality of holes in the recording material layer, by heat generated through light absorption of the recording material caused by application of condensed light to the recording material layer; and
    forming a plurality of pits in the substrate wherein the plurality of pits corresponding to the plurality of holes are etched by using as a mask the recording material layer in which the plurality of holes are formed.

2. The method according to claim 1, wherein the recording material layer comprises an organic dye.

3. The method according to claim 1,
    wherein the step of forming a recording material layer comprises:
        forming a mask layer on the substrate; and
        forming the recording material layer on the mask layer, and
    wherein the step of forming a plurality of pits comprises:
        forming a plurality of through holes in the mask layer wherein the plurality of through holes corresponding to the plurality of holes are etched by using as a mask the recording material layer in which the plurality of holes are formed; and
        forming the plurality of pits wherein the plurality of pits corresponding to the plurality of through holes are etched in the substrate by using as a mask the mask layer in which the plurality of through holes are formed.

4. The method according to claim 1, further comprising removing the recording material layer from the substrate in which the plurality of pits are formed.

5. The method according to claim 3, further comprising removing the mask layer from the substrate in which the plurality of pits are formed.

6. The method according to claim 1, further comprising providing a protective layer over the substrate in which the plurality of pits are formed.

7. The method according to claim 1, further comprising providing a reflective layer over the substrate.

8. The method according to claim 7, further comprising providing a protective layer over the reflective layer.

9. A medium on which information is recorded in an optically readable manner, which is manufactured by the method according to claim 8.

10. The method according to claim 1, wherein the step of forming a plurality of pits comprises etching on the substrate by a dry etching process.

11. The method according to claim 1, wherein the step of forming a plurality of pits comprises etching on the substrate by an anisotropic etching process.

12. The method according to claim 1, wherein the step of forming a plurality of pits comprises etching on the substrate by a reactive ion etching process.

13. An information recording medium manufactured by the method according to claim 6.

14. The method according to claim 6, wherein the protective layer is made of an inorganic material.

15. The method according to claim 1, further comprising forming a barrier layer over the recording material layer, wherein the plurality of holes are formed in the recording material layer and the barrier layer, and the recording material layer and the barrier layer in which the plurality of holes are formed are used as a mask to form the plurality of pits in the substrate.

16. The method according to claim 15, wherein the barrier layer is configured to protect the recording material layer.

* * * * *